No. 878,583. PATENTED FEB. 11, 1908.
H. F. WEINLAND.
APPARATUS FOR CLEANING BOILER TUBES.
APPLICATION FILED OCT. 31, 1903.
6 SHEETS—SHEET 1.
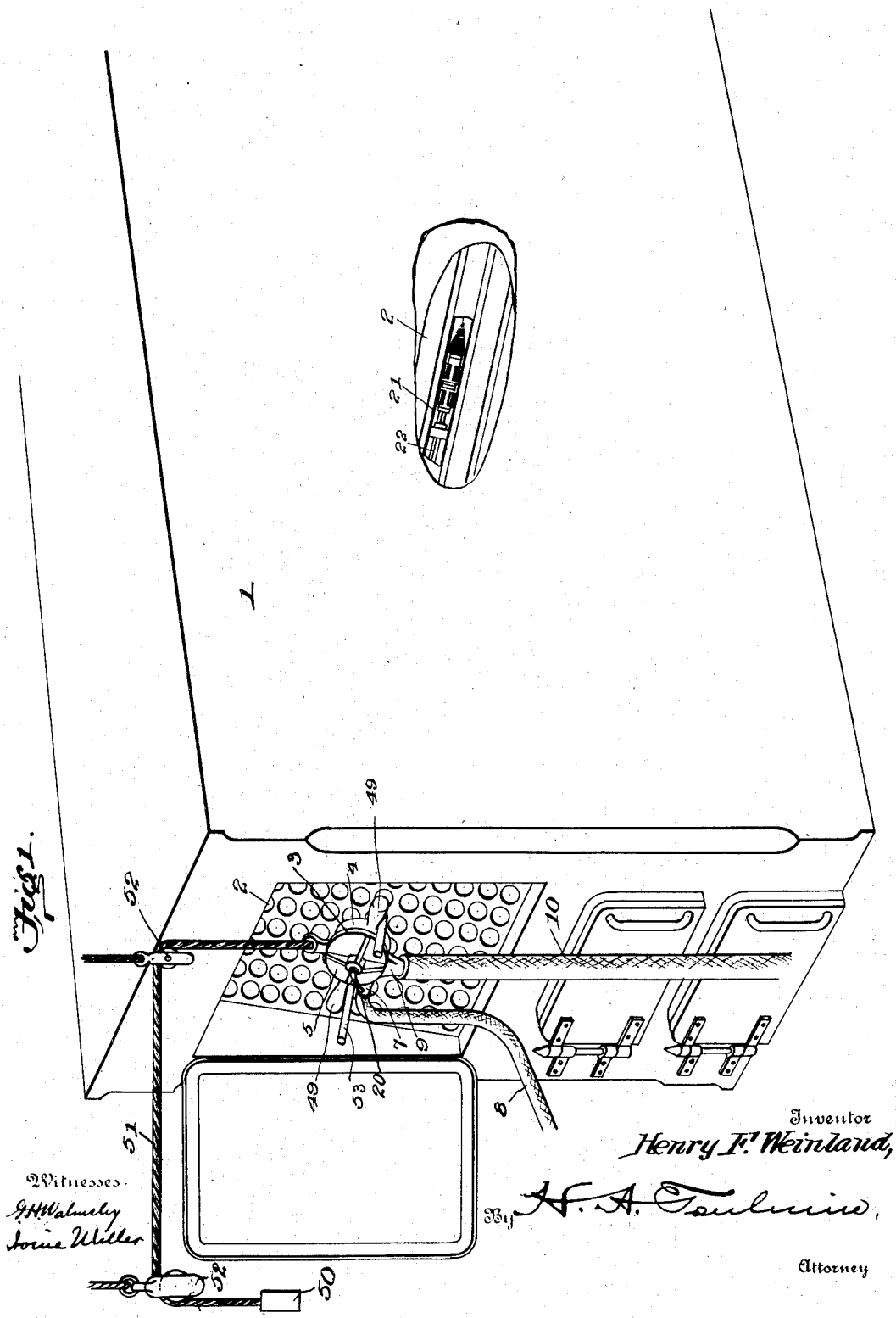
Inventor
Henry F. Weinland,
By H. A. Toulmin,
Attorney
Witnesses No. 878,583. PATENTED FEB. 11, 1908.
H. F. WEINLAND.
APPARATUS FOR CLEANING BOILER TUBES.
APPLICATION FILED OCT. 31, 1903.
6 SHEETS—SHEET 2.
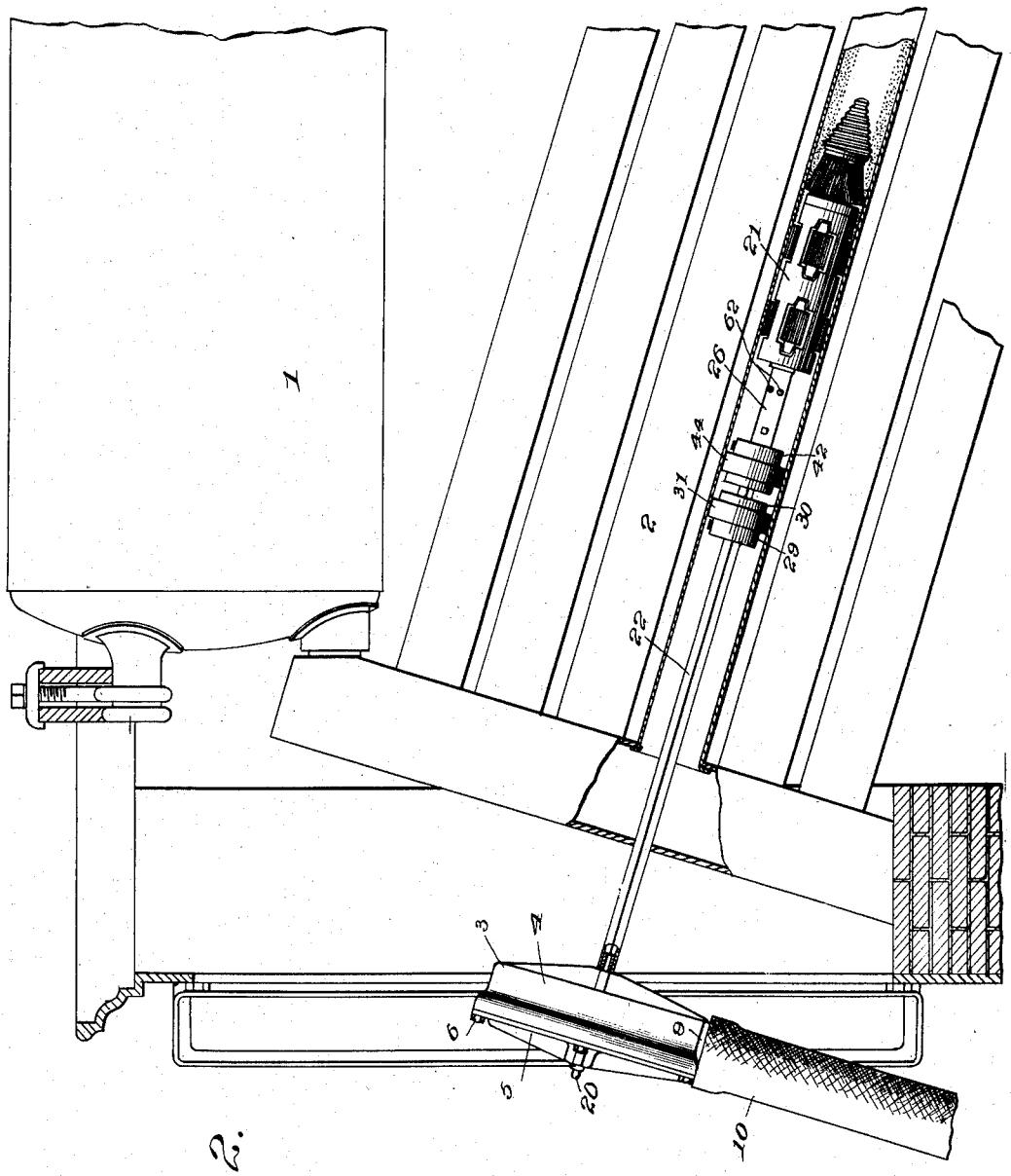
Witnesses
G. Howard Walmsley
Irvine Miller
Inventor
Henry F. Weinland,
By H. A. Toulmin,
Attorney No. 878,583. PATENTED FEB. 11, 1908.
H. F. WEINLAND.
APPARATUS FOR CLEANING BOILER TUBES.
APPLICATION FILED OCT. 31, 1903.
6 SHEETS—SHEET 3.
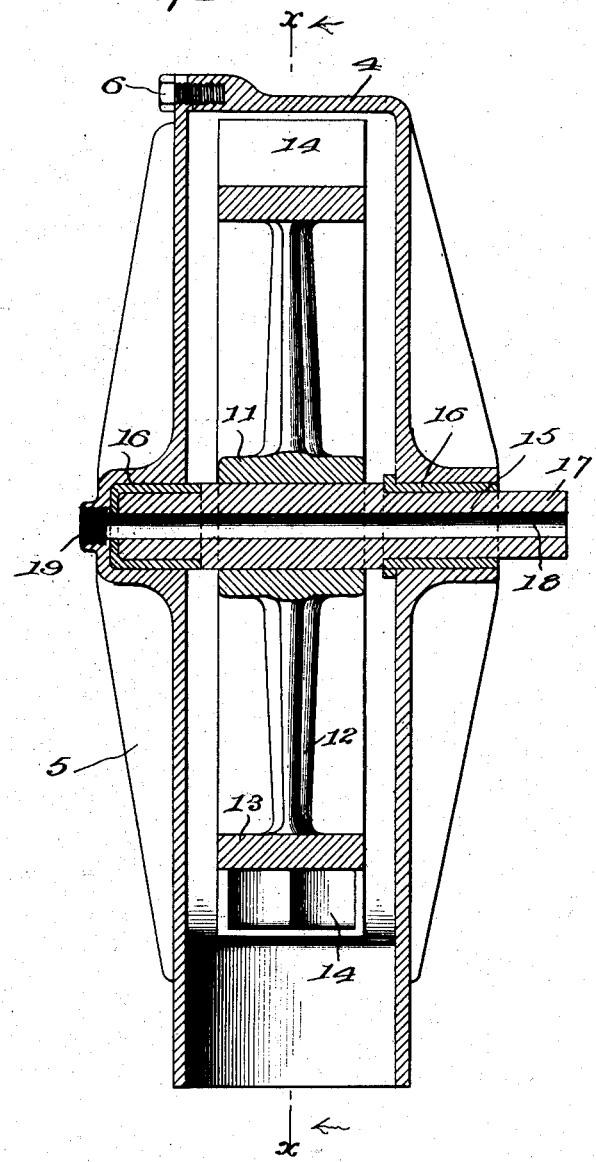
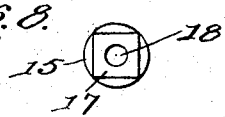
Witnesses
G. Howard Walmsley
Irvine Miller.
Inventor
Henry F. Weinland,
By
Attorney No. 878,583. PATENTED FEB. 11, 1908.
H. F. WEINLAND.
APPARATUS FOR CLEANING BOILER TUBES.
APPLICATION FILED OCT. 31, 1903.

6 SHEETS—SHEET 4.

Witnesses
G. Howard Walmsley
Ivonie Miller

Inventor
Henry F. Weinland,
By H. A. Toulmin,
Attorney

No. 878,583. PATENTED FEB. 11, 1908.
H. F. WEINLAND.
APPARATUS FOR CLEANING BOILER TUBES.
APPLICATION FILED OCT. 31, 1903.
6 SHEETS—SHEET 5.
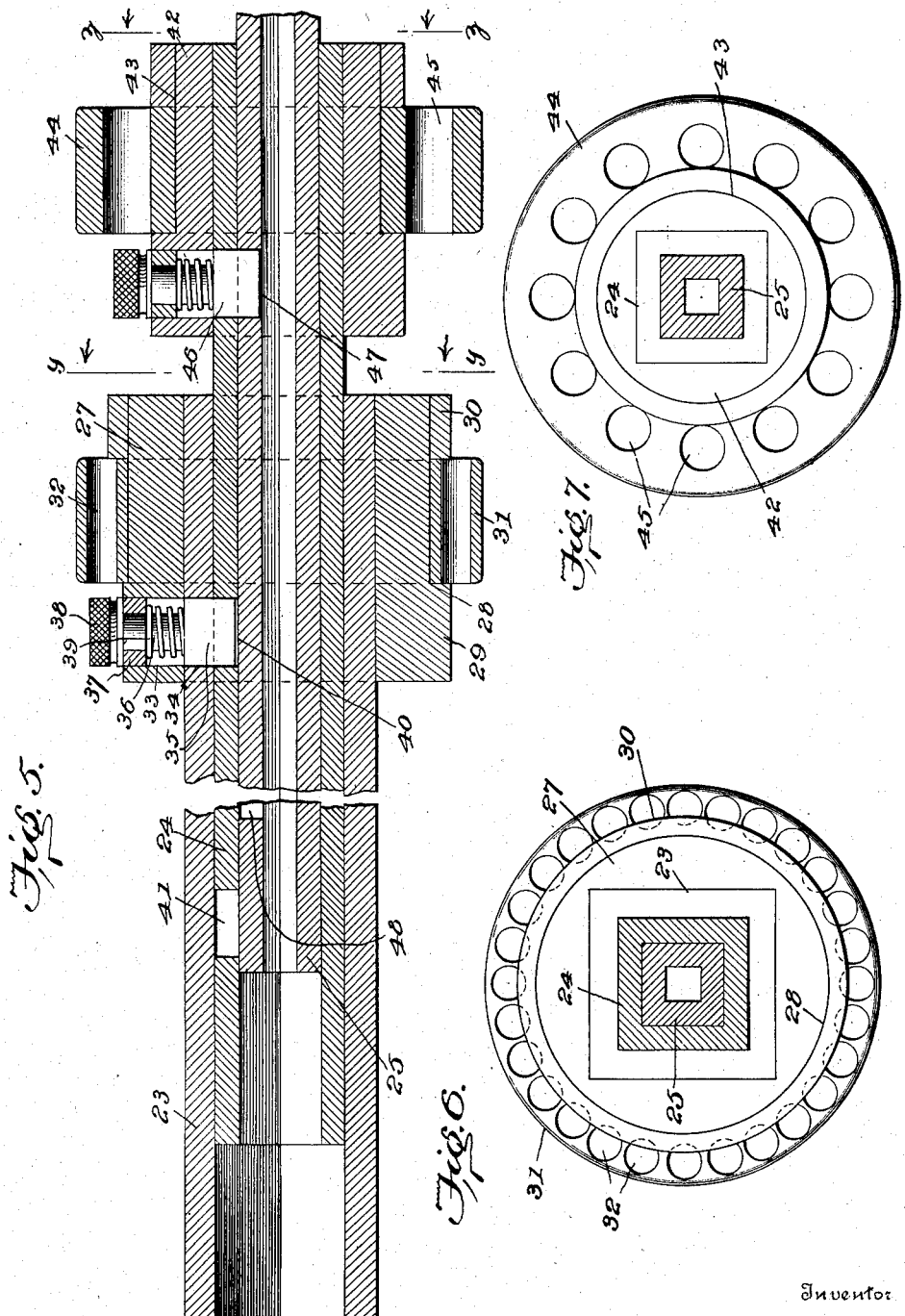
Witnesses
G. Howard Walmsley.
Irvine Miller.
Inventor
Henry F. Weinland,
By H. A. Toulmin
Attorney No. 878,583. PATENTED FEB. 11, 1908.
H. F. WEINLAND.
APPARATUS FOR CLEANING BOILER TUBES.
APPLICATION FILED OCT. 31, 1903.

6 SHEETS—SHEET 6.

Witnesses
G. Howard Walmsley
Annie Miller

Inventor
Henry F. Weinland,
By H. A. Toulmin,
Attorney

UNITED STATES PATENT OFFICE.

HENRY F. WEINLAND, OF SPRINGFIELD, OHIO, ASSIGNOR TO THE LAGONDA MANUFACTURING COMPANY, OF SPRINGFIELD, OHIO, A CORPORATION OF OHIO.

APPARATUS FOR CLEANING BOILER-TUBES.

No. 878,583.     Specification of Letters Patent.     Patented Feb. 11, 1908.

Application filed October 31, 1903. Serial No. 179,273.

*To all whom it may concern:*

Be it known that I, HENRY F. WEINLAND, a citizen of the United States, residing at Springfield, in the county of Clark and State of Ohio, have invented certain new and useful Improvements in Apparatus for Cleaning Boiler-Tubes, of which the following is a specification, reference being had therein to the accompanying drawings.

This invention relates to apparatus for cleaning boiler tubes, and more particularly to the mechanism whereby rotary motion at a high rate of speed is imparted to the cleaner head or cleaning tool proper, and whereby the said head or tool is fed to its work.

It is the object of my invention to provide an apparatus in which the motor may be an external motor, located outside of the tube to be cleaned, and therefore of sufficient size to give ample power and speed, while the cleaner head or cleaning tool proper is positively and rigidly connected with the motor when at work, so that the movements of said cleaner head may be readily and accurately controlled.

To these and other ends, my invention consists in certain novel features which I will now proceed to describe, and will then particularly point out in the claims.

Figure 4:
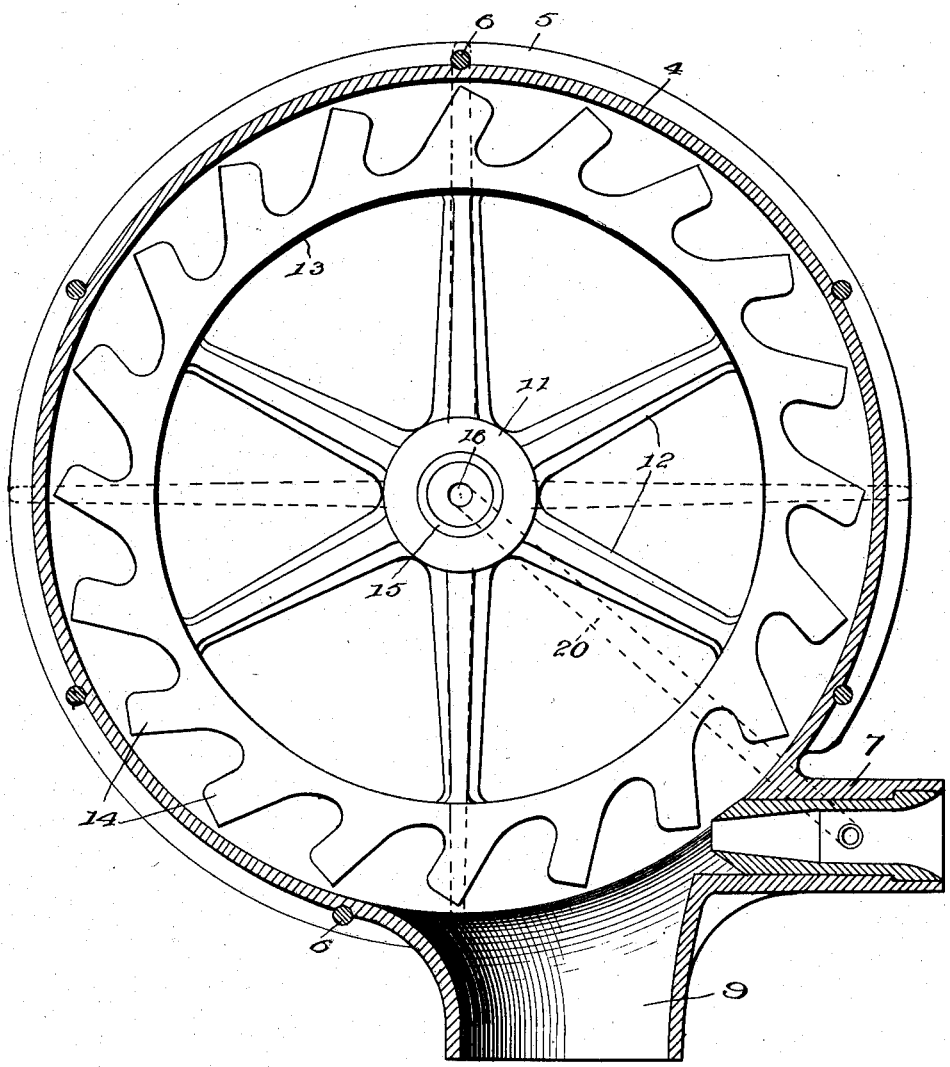
Figure 9:
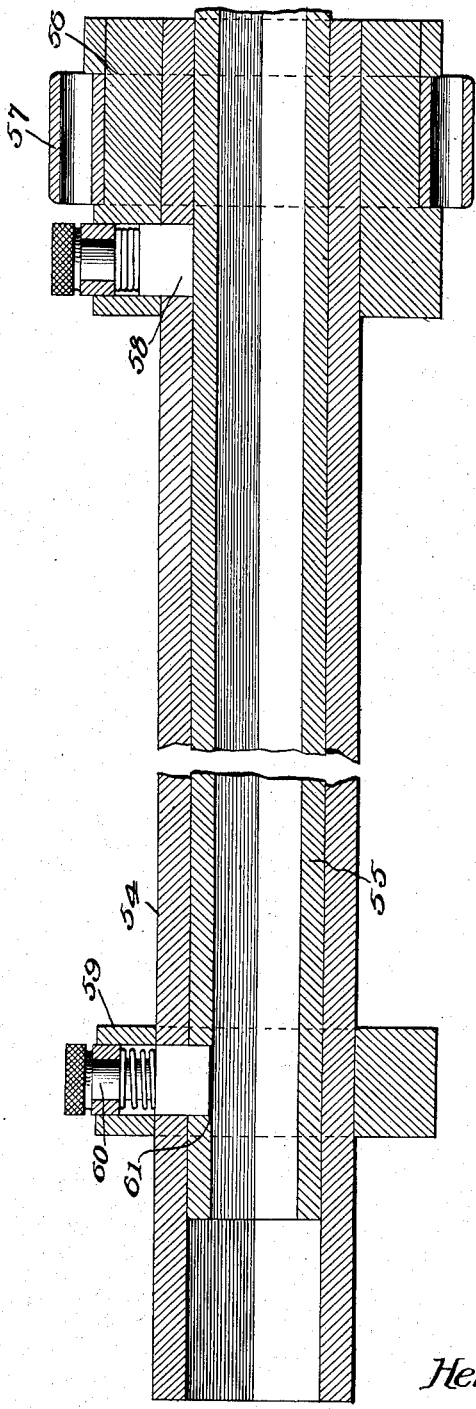

In the accompanying drawings, Figure 1 is a perspective view, partly in section, illustrating the application of my improved apparatus to a well known type of boiler; Fig. 2 is a longitudinal sectional view of the same; Fig. 3 is an enlarged detail view of the motor, in the same plane of section as Fig. 2; Fig. 4 is a sectional view of the motor, taken on the line *x x* of Fig. 3, and looking in the direction of the arrows; Fig. 5 is a central longitudinal sectional view of the shaft and its supporting bearings; Fig. 6 is a sectional view, taken on the line *y y* of Fig. 5, and looking in the direction of the arrows; Fig. 7 is a sectional view, taken on the line *z z* of Fig. 5, and looking in the direction of the arrows; Fig. 8 is a detail elevation of one end of the motor wheel shaft; and Fig. 9 is a view similar to Fig. 5, illustrating a modification.

In the said drawings, 1 indicates a boiler, and 2 the tubes thereof, which are to be cleaned. These tubes are straight and parallel, as shown in the drawing. The motor as a whole is indicated by the reference numeral 3, and is preferably a rotary fluid pressure motor of the water wheel class, the form shown being what is known as a Pelton wheel. It comprises a casing 4, one side of which, 5, is removable, being held in place by screws 6. This casing is provided near its lower portion with an inlet nozzle 7, to which is connected a hose or flexible pipe 8, by means of which water under pressure is supplied to the motor. At the bottom of the casing, immediately below the wheel and in front of and below the nozzle 7, is the waste outlet 9, to which a hose 10 may be connected for the purpose of conducting the waste water to any suitable point of discharge. The wheel proper consists of a hub 11, arms 12 and a rim 13, this latter provided with buckets 14, of the well known Pelton type. This wheel is secured on a shaft 15, which rotates in bearings 16 in the casing 4. The shaft 15 projects beyond the casing at one end, as indicated at 17, and this projecting end is square in cross section, as shown in Fig. 8. The shaft 15 is provided with an opening or passage 18, extending through it from end to end. This passage 18, at the inclosed end of the shaft, registers with an opening 19 in the bearing at that end of the shaft, said opening being connected by a pipe 20 with the nozzle 7, so that a portion of the water supply is diverted from the nozzle through the pipe 20, and through the passage 18 in the shaft 15.

The cleaner head or cleaning tool proper is indicated by the reference numeral 21, and may be of any suitable construction. It is connected with the motor, so as to rotate and be fed forward in unison therewith, by means of a rigid shaft, indicated as a whole by the reference numeral 22. This shaft is a hollow, extensible or telescopic shaft, built up of sections adapted to slide the one within the other, so that the shaft may be lengthened or shortened as desired. In the particular form of construction shown in Figs. 5 to 7 inclusive, said shaft is composed of three sections, indicated respectively by the reference numerals 23, 24 and 25. Each of these sections is hollow and square in cross section, both internally and externally, the section 24 fitting within the section 23, and the section 25 fitting within the section 24. The outer end of the section 23 fits over the squared end 17 of the motor wheel shaft 15, being secured thereon in any suitable manner. At the other end of the shaft 22, the outer end of the section 25 thereof is connected to the cleaner head 21, so as to cause said head to rotate and move longitudinally with said shaft section, this connection being effected in any suitable manner, as, for instance, by means of a socket 26 on the shank of the cleaner head, in which socket the end of the shaft section is secured by any suitable fastening device.

On the end of the section 23 farthest from the motor there is secured a collar 27, which forms part of a supporting bearing for the shaft within the tube, and also constitutes a convenient means for supporting the locking pin which serves to connect the sections 24 and 25. In connection with the first named of these two functions, said collar 27 is provided with a circumferential groove 28, formed between an integral shoulder or enlargement 29, and a removable shoulder or enlargement 30. This latter may be in the form of a separate ring, secured in position, after the parts are assembled, in any suitable manner. In the groove 28 there fits, between the shoulders 29 and 30, an antifriction ring or annulus 31, of an external diameter corresponding with the internal diameter of the tubes to be cleaned, said ring forming a bearing in which the collar 27 may freely rotate. Said ring is also preferably provided with a plurality of apertures 32, extending through it in the direction of the length of the tube to be cleaned, and constituting passages through which the water employed in the cleaning operation may freely pass. In connection with the second function of the collar 27, said collar is provided with a radial aperture 33, which registers with a similar aperture 34 in the section 23. A locking pin 35 is fitted to slide in said aperture, and is provided with a stem 36, passing through an aperture in a collar 37, which fits the outer end of the aperture 33, said stem being provided on its projecting outer end with an operating head 38, which may be readily grasped to operate the locking pin. The collar 37 is removably secured in the position shown, and the stem 36 slides therein, the spring 39 acting to force the locking pin radially inward, and the inward movement being limited by the contact of the head 38 with the collar 37. A spring 39 is coiled around the stem 36, and bears at one end against the pin 35, its other end bearing against the collar 37, said spring acting to force the locking pin inward. The shaft section 24 is provided near one end with an aperture 40, and near its other end with an aperture 41, said apertures being adapted to receive the locking pin 35 when brought opposite the same. When the pin is engaged with the aperture 40, as shown in Fig. 5, the shaft section 24 is pushed within the shaft section 23. When said shaft section 24 is drawn out or extended, the locking pin engages the aperture 41.

The shaft section 24 is provided, at that end thereof farthest from the motor, with a collar 42 secured thereon, said collar corresponding with the collar 27, and having a circumferential groove 43 to receive an antifriction ring 44, which fits the tube to be cleaned, and furnishes a bearing for the collar 42 and shaft section 24. The ring 44 is provided with longitudinal water passages 45, corresponding with the water passages 32 of the ring 31. Said collar 42 also carries a spring locking pin 46, similar to the locking pin 35, and adapted to engage with either one of two apertures 47 and 48 near the two ends of the shaft section 25. By this means said shaft section 25 may be locked in position either when it is retracted within the section 24 or when it is extended from said section.

It will thus be seen that the shaft 22 is extensible, its structure being such that its length may be increased to correspondingly vary the distance between the cleaning tool and the motor, and thereby increases the range of work of the apparatus by enabling it to operate on long tubes. It will be noticed, however, that when the device is in operation, the distance between the cleaning tool and motor is fixed, and the two move in unison during the feeding movements of the apparatus. It will further be noted that the bearing rings 31 and 44 not only serve to form bearing supports for the shaft 22 within the tube, but also form gages to determine whether the cleaning tool has properly removed the incrustations, since these rings conform to the interior diameter of the tube, and prevent the apparatus as a whole from advancing through the tube until the incrustation has been entirely removed in advance of them by the cleaning tool.

I also provide means for supporting the motor and the projecting portion of the shaft 22, so as to relieve the operator of the task of holding said parts in place against the downward action of gravity. In this connection it should be noted that the motor casing is provided with horizontally extending handles 49, by means of which it is held by the operator when in use. The motor, although of relatively large size, so as to produce ample power and speed, is nevertheless portable, in the sense of being readily movable toward and from the work. In order to support the motor in the respects just referred to, I may employ a counterweight 50, connected with the motor casing by means of a rope or other flexible connection 51, passing over guide pulleys 52, supported from the roof of the boiler house, or any other point of support, in any approved manner. This constitutes an extendible supporting device the extendibility being vertical, lateral and longitudinal to the boiler tubes and which relieves the operator of the weight of the motor, and at the same time leaves it free to move forward and back in feeding the cleaner to the work and withdrawing it therefrom. I may also employ for this purpose rods 53, which are inserted in the boiler tubes on each side of the tube operated upon, their ends projecting from the boiler front so as to permit the handles 49 to rest thereon, as shown in Fig. 1. These rods serve not only to support the motor, but also to guide it when moved forward or backward, so that its movement will be in alinement with the tube in which work is being done. Either one of these supporting devices, to-wit, the counterweight 50 or the rods 53, may be dispensed with.

In operation, the shaft 22 is shortened to its minimum extent, and the cleaning tool is then introduced into the tube to be cleaned, the motor being supported in proper position to permit this by the supporting devices and by the operator. The water under pressure then imparts a rapid rotary motion to the water wheel, which motion is communicated directly to the cleaning tool, and as this latter cuts the scale or incrustation away, the entire apparatus, comprising the motor, the cleaning tool, and the connecting shaft, is advanced by the operator pressing forward on the handles 49. As the cleaner gradually cuts its way into the tube, the motor advances along with it, and during this operation a portion of the water supply is diverted through the pipe 20, and passes down through the hollow motor shaft 15 and hollow connecting shaft 22 to the cleaner, which is thus supplied with water, which serves to aid its work and wash away the accumulations of loosened scale. Where the boiler tubes are inclined downward from their front ends, as in the construction shown, the weight of the motor aids in feeding forward the tool and materially lessens the labor required of the operator.

In the practical operation of the tool, it is frequently necessary or desirable to cause the tool to travel back and forth longitudinally of the tube so as to repeatedly operate upon the particular section of the tube being cleaned, to insure a complete cleaning of its surface before advancing the tool to attack the unclean portion lying in advance of the same. This is accomplished by repeatedly drawing back and advancing the tool over a comparatively short space, and it will be seen that the motor, tool and shaft are so connected and supported that this can be readily accomplished by the operator, since the parts are so supported as to be free to be readily moved by hand backward and forward in the direction of the length of the tube.

When the motor has worked forward to a point near the boiler front, the fluid pressure is turned off and the apparatus is moved outward until access can be had to the locking pin 35, which is then raised so as to permit the section 24 of the shaft 22 to be moved outward so as to lengthen said shaft. The operation then proceeds as before until it is necessary to again lengthen the shaft, which may be accomplished by withdrawing it sufficiently to release the locking pin 46 and extend the shaft section 25. In this way, boiler tubes of unusual length may be readily cleaned throughout their entire extent, and it is of course obvious that a greater number of sections than three may be employed to constitute the shaft 22.

In practice, I have found that, in the majority of cases, two sections of the connecting shaft are sufficient, and in Fig. 9 I have shown such a construction, the shaft being composed of two sections only, 54 and 55. In this construction, the outermost section, 54, is provided at the end farthest from the motor with a collar 56, bearing ring 57 and locking pin 58, similar to those already described. It is further provided, at the end nearest the motor, with a collar 59 and locking pin 60. The inner section 54 is provided at the end thereof nearest the motor with an aperture 61 to receive the locking pin 60, when the section 55 is withdrawn within the section 54. When said section 55 is extended, the aperture 61 is engaged by the locking pin 58. This structure is advantageous for the reason that when it is desired to lengthen the shaft 22, it is not necessary to withdraw the cleaning tool from its contact with the material on which it is operating, since the locking pin 60 is located close to the motor and is readily accessible to permit the section 54 to be disengaged from the section 55 and be drawn outward, leaving the section 55 in position in the tube.

Various modifications in the details of the construction hereinbefore described will readily suggest themselves. For instance, while the shaft 22 and the end 17 of the shaft 15 have been referred to as square in cross section, they may be of any other non-circular form which will enable them to properly accomplish the functions ascribed to them. Again, although the particular form of motor wheel described is one well adapted for the purpose, other forms of water wheel or other forms of motor may be employed, provided the motor is portable in the sense of being readily movable by the operator, and in which sense I have employed said term in the description and claims. The water is discharged at the inner end of the shaft 22 in any suitable manner, as, for instance, by apertures 62 in the collar 26, as indicated in Fig. 2. I therefore do not wish to be understood as limiting myself strictly to the precise details of construction hereinbefore described and shown in the accompanying drawings.

Having thus fully described my invention, what I claim as new and desire to secure by Letters Patent is:—

1. An apparatus for cleaning boiler tubes comprising a cleaning tool adapted to pass through the tube, a portable mechanical motor, a rigid shaft connecting the motor and cleaning tool, and a universally flexible support for the motor, said support being secured so as to permit the free rise and fall of said motor, whereby all movements of the motor are unobstructed.

2. An apparatus for cleaning boiler tubes, comprising a cleaning tool adapted to pass through the tube, a portable mechanical motor of greater diameter than the tool and comprising a water wheel, its shaft and an inclosing casing provided with operating handles, a shaft rigidly connecting the cleaning tool and water wheel shaft, and means for supporting said motor so that it is free to move in a direction longitudinally of the tubes, said means comprising a counterweight, a pulley and a flexible connection between the counterweight and motor casing passing over the pulley, substantially as described.

3. An apparatus for cleaning boiler tubes, comprising a cleaning tool adapted to pass through the tube, a portable motor of greater diameter than the tool, means for supporting said motor so that it is free to move in a direction longitudinally of the tube, said means comprising a counterweight, a pulley, and a flexible connection between the counterweight and motor case passing over the pulley, and a shaft rigidly connecting the motor and cleaning tool and provided between said motor and tool with bearing rings adapted to fit the interior of the tube and moving longitudinally with the shaft, said shaft rotating in said rings, substantially as described.

4. An apparatus for cleaning boiler tubes, comprising a cleaning tool adapted to pass through the tube, a motor of greater diameter than the tool, and a shaft rigidly connecting the motor and cleaning tool, said shaft being composed of a plurality of telescoping sections, and means for locking the sections in extended or contracted positions, substantially as described.

5. An apparatus for cleaning boiler tubes, comprising a cleaning tool adapted to pass through the tube, a motor of greater diameter than the tool, and a shaft rigidly connecting the motor and cleaning tool, said shaft being composed of a plurality of telescoping sections, and means for locking the sections in extended or contracted positions, some of said sections being provided with bearing rings adapted to fit the interior of the tube and moving longitudinally with the shaft, said shaft rotating in said rings, substantially as described.

6. An apparatus for cleaning boiler tubes, comprising a cleaning tool adapted to pass through the tube, a portable water motor of greater diameter than the tool, a hollow telescopic sectional shaft connecting the tool and water motor, means for locking the shaft sections against longitudinal motion relatively to each other, and means for conducting a portion of the water supply through said shaft to the tool, substantially as described.

7. In an apparatus for cleaning boiler tubes, the combination, with a cleaning tool adapted to pass through the tube, of a portable water motor of greater diameter than the tool and comprising a water wheel with a hollow shaft and an inclosing casing in which said wheel and shaft are mounted, said casing being provided with an inlet nozzle and a main discharge for the waste water outside of the tube, and a pipe connecting the inlet nozzle with one end of the hollow water wheel shaft, and a hollow shaft rigidly connecting the cleaning tool with the other end of the water wheel shaft, substantially as described.

8. In an apparatus for cleaning boiler tubes, the combination, with a cleaning tool adapted to pass through the tube, and a motor, of a shaft connecting said tool and motor and comprising a plurality of sections, certain of which are provided with a bearing for the shaft within the tube, said bearing comprising a grooved collar on the shaft, and a bearing ring adapted to fit the tube so as to be held from rotation thereby and also fitting the grooved collar so as to form a bearing therefor, substantially as described.

9. In an apparatus for cleaning boiler tubes, the combination, with a cleaning tool and a motor, of a shaft connecting the two and comprising a plurality of telescoping sections provided with bearing rings, and means for locking the shaft sections against longitudinal motion relatively to each other, substantially as described.

10. In an apparatus of the character described, the combination, with a cleaning tool and a motor, of a shaft connecting the two and provided with a grooved collar, and a bearing ring mounted in said collar and provided with apertures for the passage of water, said collar being free to rotate relatively to said ring, substantially as described.

11. In an apparatus for cleaning boiler tubes, the combination, with a cleaning tool adapted to pass through the tube, and a portable motor of greater diameter than the tool, of a sectional shaft connecting said tool and motor and composed of telescoping sections, non-circular in cross section, the inner sections provided with locking apertures and the outer sections provided with spring-locking pins to engage said apertures, substantially as described.

12. An apparatus for cleaning boiler tubes, comprising a cleaning tool adapted to pass through the tube, a portable motor of greater diameter than the cleaning tool, and a sectional shaft connecting said tool and motor, said shaft being composed of telescoping sections, the inner sections provided with locking apertures, the outer sections having a collar secured thereon and provided with a circumferential groove, a bearing ring mounted in said groove, and a spring-locking pin also mounted in said collar and adapted to engage the apertures of the inner section. substantially as described.

In testimony whereof I affix my signature in presence of two witnesses.

HENRY F. WEINLAND.

Witnesses:
E. O. HAGAN,
IRVINE MILLER.